United States Patent
Beer et al.

(10) Patent No.: US 6,657,534 B1
(45) Date of Patent: Dec. 2, 2003

(54) REMOTE POWER CONTROL

(75) Inventors: Reginald Beer, Eastleigh (GB); Robert Frank Maddock, Southampton (GB); Michael Alan Veal, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,025

(22) Filed: Apr. 12, 2000

(30) Foreign Application Priority Data

Dec. 23, 1999 (GB) .............................. 9930284

(51) Int. Cl.[7] .............................. G06F 1/26; G06F 1/32
(52) U.S. Cl. ........................ 340/3.1; 713/300; 713/310; 713/320; 713/323; 713/324
(58) Field of Search ........................... 340/3.1; 713/300, 713/323, 322, 321, 310, 320, 324

(56) References Cited

U.S. PATENT DOCUMENTS

| 4,747,041 | A | * | 5/1988 | Engel et al. ................... 307/29 |
| 4,835,706 | A | * | 5/1989 | Asahi .......................... 340/3.1 |
| 5,404,544 | A | * | 4/1995 | Crayford ..................... 713/310 |
| 5,408,668 | A |   | 4/1995 | Tornai |
| 5,483,464 | A | * | 1/1996 | Song ............................ 307/38 |
| 5,489,809 | A |   | 2/1996 | Kaya et al. |
| 5,713,027 | A | * | 1/1998 | Soejima et al. ............. 709/224 |
| 5,919,263 | A | * | 7/1999 | Kikinis et al. .............. 713/300 |
| 5,936,442 | A |   | 8/1999 | Liu et al. |
| 5,974,551 | A | * | 10/1999 | Lee ............................ 713/300 |
| 5,978,923 | A | * | 11/1999 | Kou ........................... 713/320 |

* cited by examiner

Primary Examiner—Brian Zimmerman
Assistant Examiner—Clara Yang
(74) Attorney, Agent, or Firm—Ido Tuchman; Louis P. Herberg

(57) ABSTRACT

A method is provided for remotely controlling power to electronic devices. Each device includes two or more ports for receiving signals over the serial link. The method includes issuing a shutdown command from the host data processing system to selected one of the devices over the link and responsive to the receipt of a power-off command at a device, causing the device to enter a low power standby mode on cessation of signal activity at one of the device ports. On entering standby mode at a device, standby power is supplied in the device to allow the device to monitor the one or more device ports for incoming signals. In addition, transmission of signals via the one or more ports is ceased. On receipt of a signal at any of the one or more ports that was previously inactive, power is restored to the device.

18 Claims, 3 Drawing Sheets

REMOTE POWER CONTROL

FIELD OF THE INVENTION

The present invention relates generally to the remote power control of electronic devices in a computer system.

BACKGROUND OF THE INVENTION

In modern computer systems, mass storage devices such as disk arrays, tape drives etc. are often packaged in one or more separate enclosures, with each enclosure having its own separate power supply. These separate enclosures are connected to the main processor of the computer using a parallel bus such as SCSI or a serial link employing a communication protocol such as the Serial Storage Architecture (SSA) or FiberChannel (FC-AL).

In such systems, it is desirable to have a way to remotely control the power of these separate enclosures from the main processor, so that in effect the whole computer can be turned on or off at a single switch. In the past, this has been achieved by use of an additional connection from the processor to the enclosures, using RS232, Ethernet or some other signalling protocol. This technique is referred to as out of band signalling. However installing this additional connection can be difficult or expensive, particularly where the enclosures are at considerable distance from the processor.

In computer systems of the type shown in FIG. 1, in which the device enclosures 20 are each connected to the main processor 10 by means, for example, of a SCSI bus 30, it is possible to use in-band signalling for remote power control of the enclosures. In particular the TERMPOWER line of the SCSI bus is driven by the host system and can be sensed by each enclosure, independent of any other enclosure. Thus remote power control is achieved by each enclosure sensing the TERMPOWER line which is powered if the main processor is powered. When the main processor power is shutdown, each enclosure detects the change in the TERM-POWER line and shuts itself down.

In-band signalling of this type is not possible in systems where the main processor is not separately connected to each of the enclosures. In such cases, the main processor is connected to a first enclosure which is in turn connected to a second enclosure and so on. The main processor cannot signal in-band to the second enclosure if the first enclosure is not powered.

It would be desirable to find a way to provide in-band remote power control of devices in a computer system where each device communicates only with adjacent devices.

DISCLOSURE OF THE INVENTION

According to a first aspect of the invention there is provided a method of providing remote power control of electronic devices connected for communication with at least one controlling data processing system by means of a link configured as a chain, each device including one or more ports for receiving signals over the link; the method including the steps of: issuing a shutdown command from the controlling data processing system to selected devices over the link; in response to the receipt of a shutdown command at a device, causing the device to enter a standby mode on cessation of signal activity at any of the one or more device ports; on entering standby mode at a device, supplying standby power in the device to allow the device to monitor the one or more device ports for incoming signals and ceasing transmission of signals via the one or more ports; and on receipt of a signal at any of the one or more ports that was previously inactive, restoring power to the device.

According to a further aspect of the invention there is provided an electronic device including: one or more ports for connecting the device onto a link to enable the device to communicate with a controlling data processing system; means for monitoring signal activity at the one or more ports; power control means responsive to the receipt of a shutdown command issued over the link by a connected controlling data processing system, to cause the device to power down on cessation of signal activity at one of the device ports; and auxiliary power means for supplying power to the signal monitoring means when the device is powered-down, the power control means restoring main power to the device on receipt of a signal at a port that was previously inactive.

Thus the present invention makes use of a shutdown command that causes those devices to which the command is addressed to enter a low power standby mode on cessation of signal activity on any device port. A command is employed in the present invention because an enclosure should not normally power down if a single incoming signal disappears.

Where the device is directly connected to the controlling data processing system, it will almost invariably be the case that it is the cessation of signal activity on the device port connected to the 'upstream' controlling processing system that causes the device to enter the standby mode. It is likely that at this point, the device port connected to a 'downstream' device will still be active.

When the device enters its low power standby mode, it ceases transmission of signals on all of its communication ports, causing other devices in the chain to power-off provided they too have received a shutdown command. Thus each device in the chain is powered off in turn. On entry into standby mode, this causes the main power to be turned off and signal transmission over the device ports to cease. Auxiliary power is provided in the device to monitor the device ports for incoming signals; and on detection of a signal at a port that was previously inactive, main power is restored in the device. Thus having powered down, the device powers up again automatically if a signal appears at a previously inactive port. Ports that were active when the device powered off and remain active should not cause the device to power back on. The signals at those ports must first be detected as absent before any subsequent present signal at those ports may be used to power the device back on. Thus it is only the transition from a signal being detected as absent to a signal being detected as present that can cause a device to power back on.

It is preferred that where there are a plurality of controlling data processing systems in the chain, a shutdown command is issued from one of the host data processing systems only on a determination that the other host data processing systems will not be adversely affected by the shutdown e.g. are either inactive or aware of the shutdown.

The present invention may advantageously be employed in serial communication systems employing protocols such as FC-AL or SSA but it is not limited to such systems. It may be used in any system where each device communicates directly only with an adjacent device. The exact nature of the link between the devices, whether serial or parallel, and the communication protocol employed are not central to the present invention.

The chain configuration of the devices and controlling data processing system(s) may take the form of a string or of a loop.

BRIEF DESCRIPTION OF THE DRAWINGS

A preferred embodiment of the present invention will now be described, by way of example only, with reference to the accompanying drawings.

DETAILED DESCRIPTION OF THE PREFERRED EMBODIMENT

Figure 1:
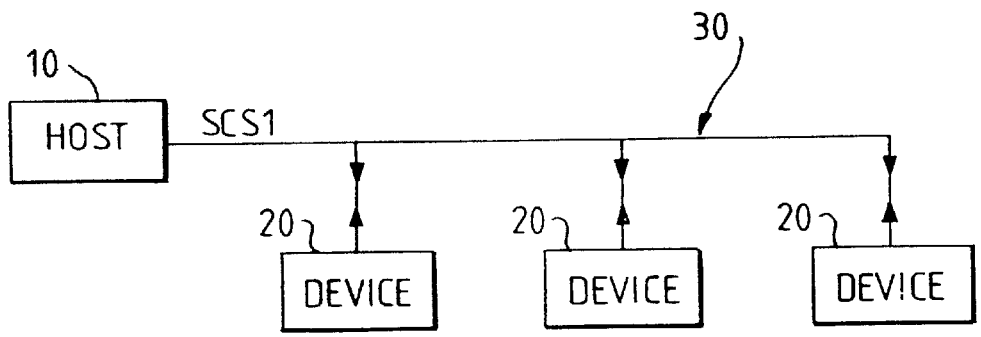
FIG. 1 is a block diagram of system in which a number of device enclosures are connected to a host system via a SCSI bus.
Figure 2:
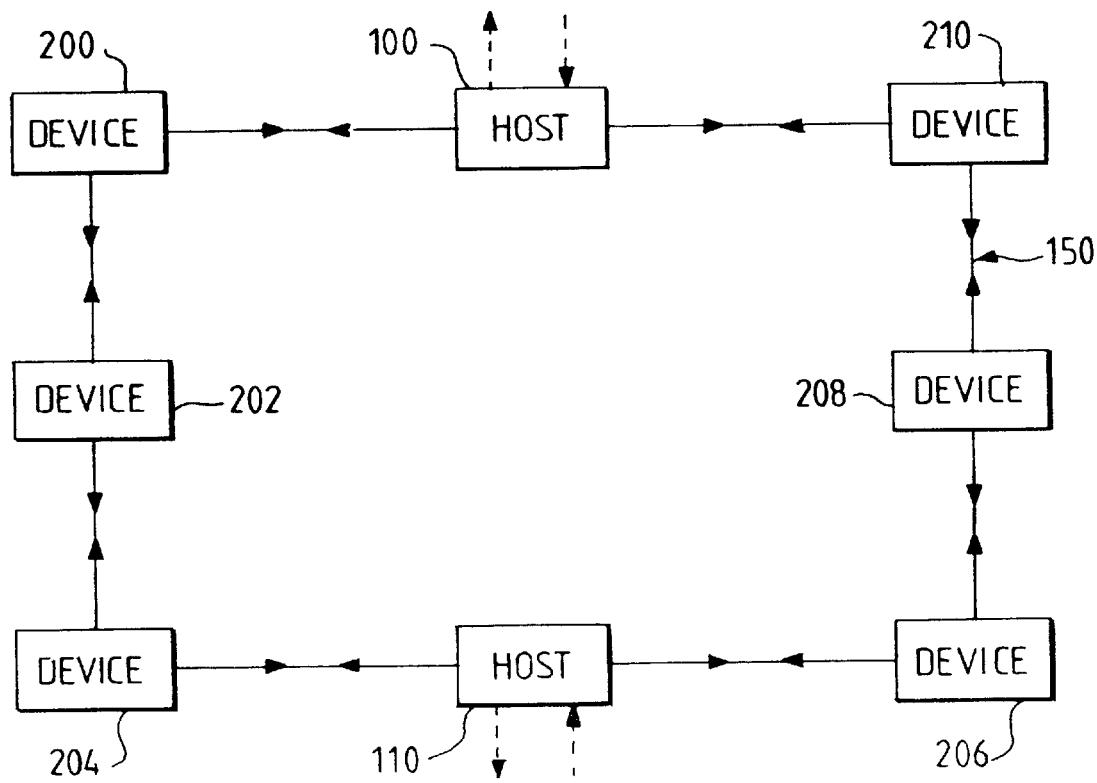
FIG. 2 is a block diagram of a system in which a number of device enclosures and host systems are connected via a serial link configured as a loop.

In FIG. 2 there is shown an example system in which two host systems are connected in a serial loop 150 to six device enclosures 200,202,204,206,208,210. Each host system may be one of a myriad forms of computer system such as a personal computer, workstation or midrange system such as the AS/400 or RISC System/6000. Each of the device enclosures may house a group of disk data storage devices configured for example as a RAID or JBOD array. The communication protocol employed may be FC-AL or SSA, details of which are publicly available. The physical link may be in the form of an optical fibre or copper link between the device enclosures and the host systems. As is known, both SSA and FC-AL links employ SCSI command sets for communication between devices on the link.

In current systems of this type, it is possible to monitor the incoming serial connections for the presence of a signal, or in the case of optical connections, light in the fibre. With such a circuit, powered by standby power, an enclosure can power up in response to incoming signals. It will then start sending outgoing signals. Thus turning on the main processor will cause all the enclosures in the loop to power up. However, powering off the main processor does not reverse this. Adjacent enclosures in the loop will continue to send signals to each other, and neither will power off.

In the present invention, a shutdown command is sent to each enclosure in the loop which instructs it to power down when any one of its incoming signals ceases. Then when the main processor 100 is powered off, the loss of signals at the first enclosure 210 in the loop causes that enclosure to power down, even though other inputs to that enclosure may still have signals. When this first enclosure powers down, it stops sending signals, and an incoming signal to the next downstream enclosure disappears. If the next enclosure has received a shutdown command then the cessation of signal activity on its upstream port will cause it in turn to enter the low power standby mode. This process repeats itself around the loop until all devices receiving a shutdown command are powered down.

Figure 3:
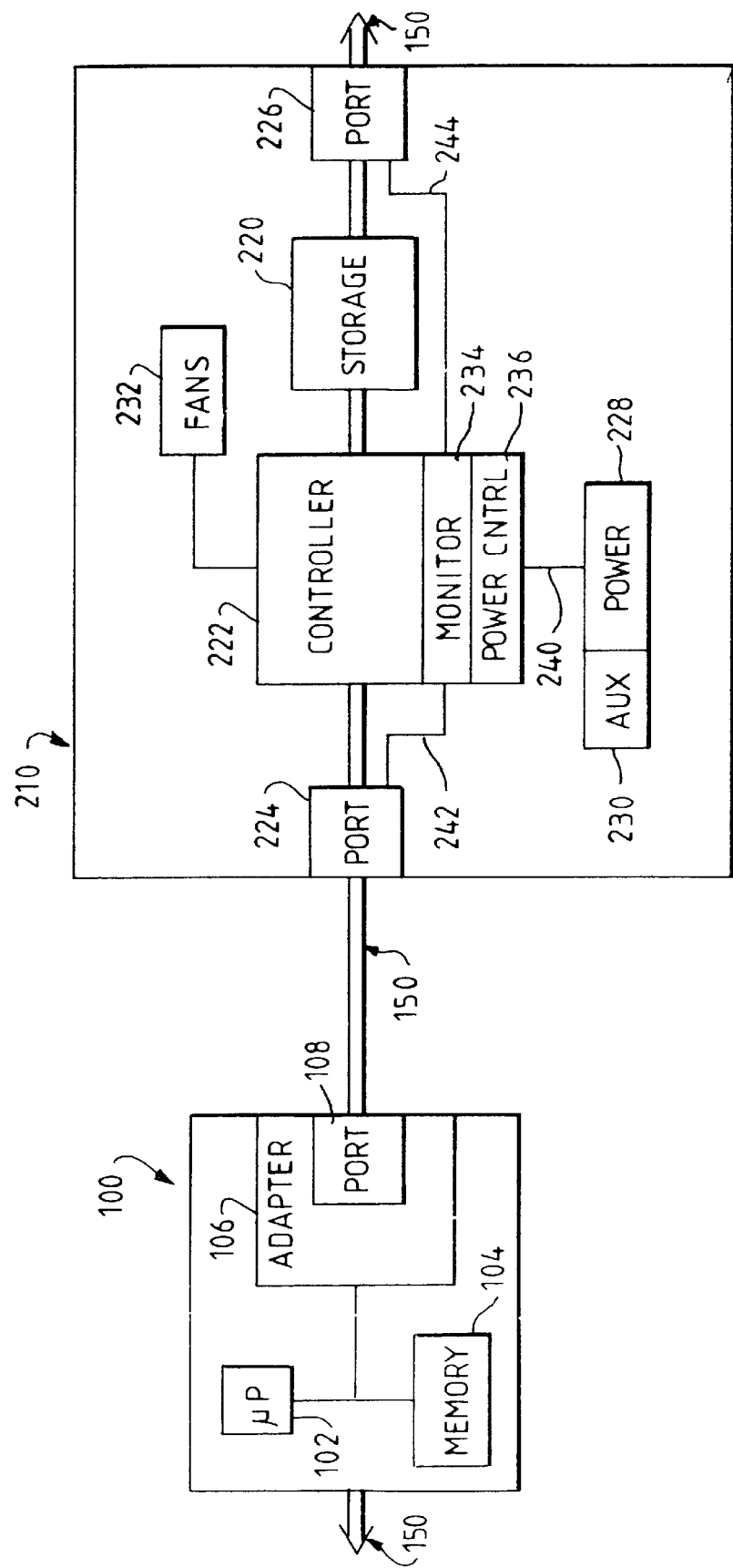
FIG. 3 is a block diagram showing more detail of a device and host system of the system of FIG. 2.

In FIG. 3 there is shown host system 100 and device enclosure 210 of FIG. 2. Host system 100 includes a main CPU 102 connected for communication to memory 104 and adapter 106. The adapter includes a port 108 which provides logic to allow the main processor to communicate over serial link 150. The device enclosure includes mass storage 220 in the form of an array of disk storage devices, the operation of which is controlled by controller 222. The storage and controller are connected via the serial link 150 to a pair of ports 224 and 226 that provide the interface logic to allow the enclosure to communicate with other devices on the link. The device further includes a main power supply 228 and an auxiliary power supply 230. The main power supply provides power to the disk storage devices, the controller and fans 232. The auxiliary power supply is used in the technique of the present invention in the manner to be described below. The controller 232 includes monitor logic 234 and power control logic 236, connected via control lines 240, 242 and 244 to the power supplies and to the ports.

Figure 4:
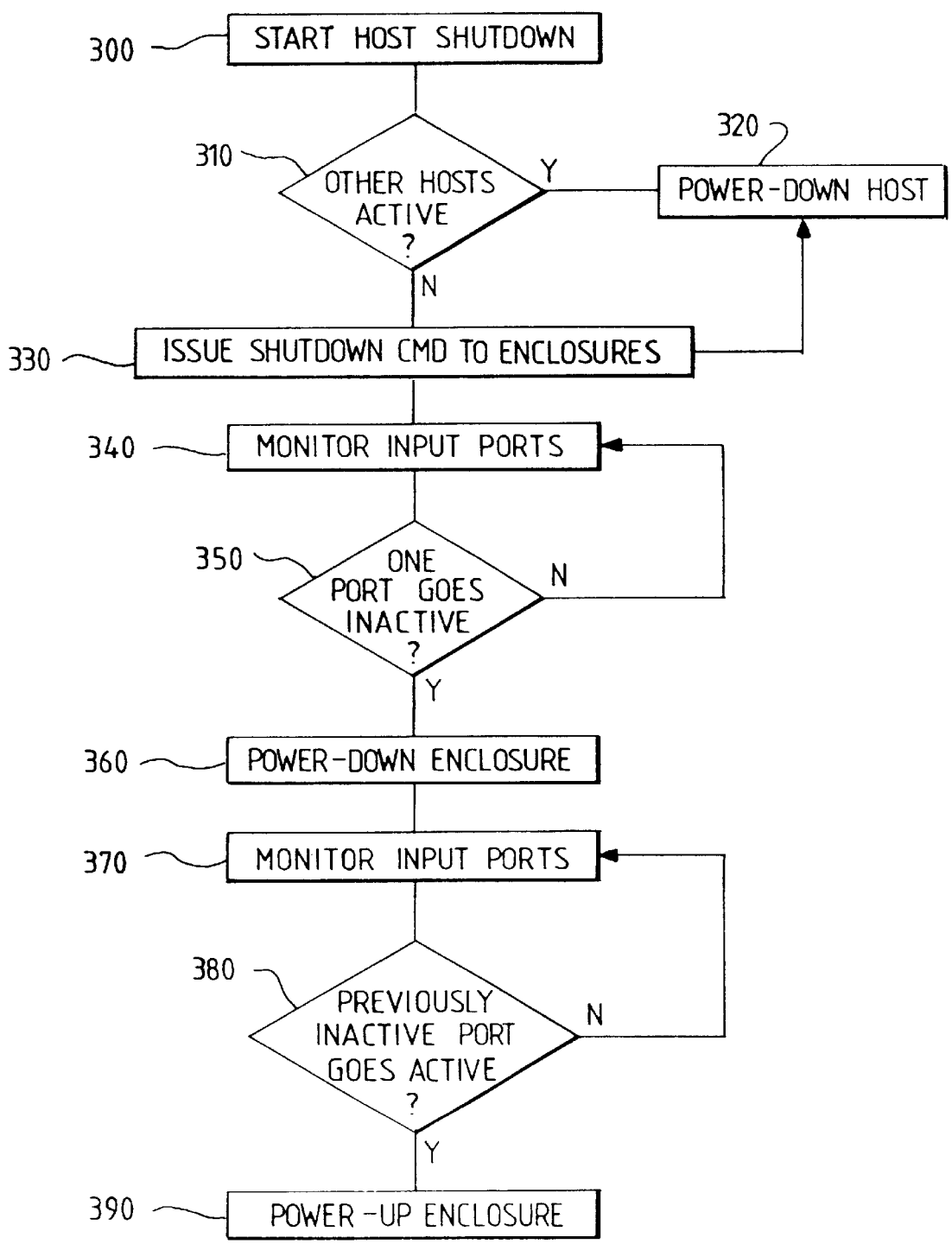
FIG. 4 is a flow chart showing the steps involved in the remote power control method of the preferred embodiment of the present invention.

The remote power control technique of the present invention will now be described with reference to FIGS. 2, 3 and 4.

Host shutdown starts at step 300 when the user wishes to power down the host system and also those device enclosures connected to it. First, the main CPU 102 causes the adapter 106 at step 310 to issue a command over the serial link to the other host system 110 to determine whether it is currently active. If the host system 100 receives a response which indicates the host system 110 is active then it may not be appropriate for the host system 100 to power-down the device enclosures on the link. Therefore the process completes at step 320 by powering down the host system 100.

If the host 100 receives an indication that host system 110 is inactive then the process continues at step 330 where the main CPU 102 causes the adapter 106 to issue a shutdown command over the serial link 150 via port 108. This shutdown command may conveniently take the form of a SCSI diagnostic command. As each device enclosure is separately addressable under SSA or FC-AL, the shutdown command can be targeted at selected ones of the device enclosures. However it will often be the case that the user will want to power-down all connected enclosures and consequently a shutdown command is sent to each enclosure.

At step 340, on receipt of a shutdown command via port 224 of enclosure 210, the controller 222 causes monitor logic 234 to monitor signal activity on each of ports 224 and 226. At step 350, when one port goes inactive, then the enclosure enters a standby mode wherein the power control logic is caused to power-down the enclosure by removing main power to the storage devices, fans etc. (step 360). Transmission of signals via the ports is also ceased and the power control logic causes the auxiliary power supply to maintain power to ports 224 and 226, monitor logic 234 and power control logic 236. It will be understood that for reasons unrelated to the present technique, auxiliary power may be maintained to other assemblies or circuits (not shown) in the enclosure.

In standby mode, the ports are monitored for any signal activity (step 370). At step 380, when a port that was previously inactive becomes active then the enclosure is powered-up at step 390 by power control logic causing main power to be provided to the enclosure.

The technique of the present invention has thus been described in an environment where the device enclosures receive and transmit information from and to the host system. The invention may also be used where the devices only receive information.

What is claimed is:

1. An electronic device adapted to be coupled to other devices in a communication link, the electronic device comprising:

at least two ports configured to communicate to the other devices over the communication link; and a controller coupled to the at least two ports, the controller configured to:

cause the electronic device to enter a standby power mode if a shutdown command is received by the electronic device and there is a cessation of signal activity at any one of the at least two ports;

cause the electronic device to retransmit the shutdown command to at least one of the other devices in the communication link;

cause the electronic device to enter a restored power mode if communication is received at an inactive port, the inactive port being one of the at least two ports in an inactive mode; and cause the electronic device to remain in the standby power mode if communication is received at an active port, the active port being one of the at least two ports in an active mode.

2. The electronic device of claim 1, wherein the controller is further configured to cause any of the least two ports with a cessation of signal activity to enter the inactive mode if the electronic device is in the standby power mode.

3. The electronic device of claim 1, wherein during the standby power mode no ports of the electronic device transmit communications to the other devices.

4. The electronic device of claim 1, wherein the electronic device consumes less power in the standby power mode than in the restored power mode.

5. The electronic device of claim 1, wherein the communication link is a serial communication link.

6. The electronic device of claim 1, wherein the at least two ports include a first port and a second port, the first port configured to receive the shutdown command and the second port configured to retransmit the shutdown command to the at least one of the other devices.

7. A method for controlling the power mode of an electronic device, the electronic device including at least two ports adapted to communicate to other devices in a communication link, the method comprising:

causing the electronic device to enter a standby power mode if a shutdown command is received by the electronic device and there is a cessation of signal activity at any one of the at least two ports;

causing the electronic device to retransmit the shutdown command to at least one of the other devices in the communication link;

causing the electronic device to enter a restored power mode if communication is received at an inactive port, the inactive port being one of the at least two ports in an inactive mode; and causing the electronic device to remain in the standby power mode if communication is received at an active port, the active port being one of the at least two ports in an active mode.

8. The method of claim 7, further comprising causing any of the least two ports with a cessation of signal activity to enter the inactive mode if the electronic device is in the standby power mode.

9. The method of claim 7, further comprising ceasing communication transmission by the least two ports when the electronic device is in the standby power mode.

10. The method of claim 7, wherein the electronic device consumes less power in the standby power mode than in the restored power mode.

11. The method of claim 7, wherein the communication link is a serial communication link.

12. The method of claim 7, wherein the electronic device includes a first port and a second port, and wherein the method further comprises:

receiving the shutdown command at the first port; and retransmitting the shutdown command at the second port to the at least one of the other devices.

13. A computer program product embodied in a tangible media comprising:

computer readable program codes coupled to the tangible media for controlling the power mode of an electronic device, the electronic device including at least two ports adapted to communicate to other devices in a communication link, the computer readable program codes configured to:

cause the electronic device to enter a standby power mode if a shutdown command is received by the electronic device and there is a cessation of signal activity at any one of the at least two ports;

cause the electronic device to retransmit the shutdown command to at least one of the other devices in the communication link;

cause the electronic device to enter a restored power mode if communication is received at an inactive port, the inactive port being one of the at least two ports in an inactive mode; and cause the electronic device to remain in the standby power mode if communication is received at an active port, the active port being one of the at least two ports in an active mode.

14. The computer program product of claim 13, further comprising computer readable program code configured to cause any of the least two ports with a cessation of signal activity to enter the inactive mode if the electronic device is in the standby power mode.

15. The computer program product of claim 13, further comprising computer readable program code configured to cease communication transmission by the least two ports when the electronic device is in the standby power mode.

16. The computer program product of claim 13, wherein the electronic device consumes less power in the standby power mode than in the restored power mode.

17. The computer program product of claim 13, wherein the communication link is a serial communication link.

18. The computer program product of claim 13, wherein the at least two ports include a first port and a second port, the first port configured to receive the shutdown command and the second port configured to retransmit the shutdown command to the at least one of the other devices.

* * * * *